United States Patent [19]

Barbe et al.

[11] Patent Number: 4,980,329

[45] Date of Patent: Dec. 25, 1990

[54] CATALYST COMPONENT AND CATALYST FOR THE POLYMERIZATION OF ALPHA-OLEFINS TO STEREOREGULAR POLYMERS HAVING NARROW MOLECULAR WEIGHT DISTRIBUTION

[75] Inventors: Pier C. Barbe, Ferrara; Enrico Albizzati, Arona; Umberto Giannini, Milan; Giovanni Baruzzi; Luciano Noristi, both of Ferrara, all of Italy

[73] Assignee: Himont Incorporated, Wilmington, Del.

[21] Appl. No.: 353,223

[22] Filed: May 15, 1989

Related U.S. Application Data

[63] Continuation of Ser. No. 118,099, Nov. 6, 1987, abandoned.

[30] Foreign Application Priority Data

Nov. 10, 1986 [IT] Italy .................. 22262A/86

[51] Int. Cl.$^5$ .............................. C08F 4/643
[52] U.S. Cl. .................... 502/111; 502/104; 502/121; 502/122; 502/123; 502/124; 502/125; 502/126; 502/127; 526/125
[58] Field of Search ............... 502/104, 111, 121, 122, 502/123, 124, 125, 126, 127

[56] References Cited

U.S. PATENT DOCUMENTS 3,135,809  6/1964  Bosmajian ................ 502/114 X
4,294,721 10/1981  Cecchin et al. ........... 502/125 X
4,395,360  7/1983  Albizatti et al. .......... 502/125 X
4,439,540  3/1984  Cecchin et al. ........... 502/127 X
4,464,478  8/1984  Scata et al. .............. 502/111
4,525,469  6/1985  Ueda et al. .............. 502/125
4,529,716  7/1985  Banzi et al. ............. 502/121

FOREIGN PATENT DOCUMENTS 0045976  8/1981  European Pat. Off. .
0045977  8/1981  European Pat. Off. .

Primary Examiner—Patrick P. Garvin

[57] ABSTRACT

Disclosed is a component for a catalyst for the polymerization of alpha-olefins to stereoregular polymers having narrow molecular weight distribution. The product is formed by the reaction of a solid catalyst-forming component comprising (1) a Ti compound having at least one Ti-halogen bond and (2) optionally, an electron-donor compound, supported on an anhydrous Mg dihalide in active form, with certain amounts of an organic compound (AH) containing at least one active hydrogen atom, in the presence of a liquid medium which is inert with respect to the Ti compound and the other components of the catalyst component, and which has a dielectric constant greater than 2 at 20° C.

Catalysts comprising the reaction product of the solid catalyst component prepared as above described, with an Al-alkyl compound and an electron-donor compound are also disclosed.

8 Claims, No Drawings

CATALYST COMPONENT AND CATALYST FOR THE POLYMERIZATION OF ALPHA-OLEFINS TO STEREOREGULAR POLYMERS HAVING NARROW MOLECULAR WEIGHT DISTRIBUTION

This application is a continuation of Ser. No. 118,099, filed Nov. 6, 1987, now abandoned.

This invention relates to a new component for a catalyst suitable for the stereoregular (co)polymerization of alpha olefins having the formula $CH_2=CHR$, where R is an alkyl or aryl group having from 1 to 8 carbon atoms and to the catalysts comprising same.

It is known to polymerize propylene with catalysts obtained by reaction of an Al-alkyl compound, an electron-donor compound with a solid component comprising a titanium compound and an electron-donor compound supported on a Mg halide in active form. Examples of said catalyst systems are described in French Patent Nos. 2332288 and 2361423. U.S. Pat. Nos. 4,156,063, 4,107,413, 4,107,414, 4,187,196, and 4,336,360 and in European published patent application Nos. 45975, 45976, and 45977.

The above described supported catalysts, even though endowed with high activity and stereospecificity, produce propylene polymers having a relatively broad molecular weight distribution (MWD) characterized by values of Mw/Mn greater than 5, measured by gel permeation chromatography (GPC).

For some important applications, particularly in the field of the injection molding, polymers which have improved physical-mechanical properties, such as flexural rigidity, impact resistance and resistance to thermal distortion, are required. All the above-mentioned properties are associated with a narrow MWD.

Narrow MWD (MW/Mn of about 3.5) is presently achieved in the industrial practice, by subjecting polypropylene, obtained by the polymerization of propylene with $MgCl_2$-supported catalysts, to thermal degradation with peroxides. In practice the polypropylene is thermally degraded by adding peroxides during the extrusion of polymer. However, the thermal degradation process is very onerous, both from the standpoint of the large amount of energy consumed and the difficulty in controlling the process, especially the difficulty in obtaining reproducible results.

This invention provides a component for a catalyst for the polymerization or copolymerization of alpha-olefins to stereoregular polymers and copolymers having a narrow MWD (Mw/Mn of less than 4) prepared by the reaction of a solid catalyst-forming component comprising 1) a Ti compound having at least one Ti-halogen bond and 2) optionally an electron-donor compound, supported on an anhydrous Mg dihalide in active form, with an organic compound (AH) having at least one active hydrogen atom in an amount corresponding to a molar ratio of Mg/moles of AH compound of between 2 and 30, in the presence of a liquid medium having a dielectric constant greater than 2 at 20° C., which does not react with the other components.

Another embodiment of this invention is a catalyst for the polymerization or copolymerization of alpha-olefins to stereoregular polymers and copolymers having a narrow MWD comprising the reaction product of (a) an Al-alkyl compound and (b) an electron-donor compound with (c) the catalyst component as described above.

The catalyst component of this invention is prepared by the reaction of a solid catalyst-forming component comprising (1) a Ti compound having at least one Ti-halogen bond, (2) optionally, an electron-donor compound, supported on an anhydrous Mg dihalide in active form, with an organic compound (AH) having at least one active hydrogen atom in an amount corresponding to a molar ratio of Mg/moles of AH compound of between 2 and 30, in the presence of a liquid medium having a dielectric constant greater than 2 at 20° C. which medium does not react with the other components.

Suitable Ti-compounds containing at least one Ti-halogen bond include the Ti halides, such as $TiCl_4$, $TiCl_3$ and the Ti-haloalcoholates. $TiCl_4$ is the preferred compound.

The electron-donor compound which may be used in the preparation of catalyst component (c), and the electron-donor compound (b) are organic compounds containing one or more oxygen, sulphur, phosphorus or nitrogen atoms.

Such electron-donor compounds include esters of oxygenated acids halides of acids, ketones, aldehydes, alcohols ethers thioethers, amides, lactones, phosphines, phosphamides, silicon compounds, such as silanes and siloxanes, and heterocyclic compounds containing at least one nitrogen atom.

Specific examples of useful esters are the alkyl esters of aromatic mono- or polycarboxylic acids, the esters of aliphatic or aromatic acids in general, esters of aromatic hydroxyacids and the esters described in European published application Nos. 45976 and 45977. Suitable esters include methyl-, ethyl-, butyl-, octylacetate; ethyl- and ethyl phenylbutyrate; ethylvalerianate; phenylpropionate; mono- and diethylsuccinate; methyl-, ethyl-, propyl- and octylbenzoate: ethyl-p-toluate: ethyl-p-anisate; diethyl- diisobutylmalonate: diethyl-n-butylmalonate; diethyl- phenylmalonate; diisobutyladipate: dioctylsebacate; alkylmaleates; alkylarylmaleates; alkyl- and arylalkylpivalates: alkylacrylates and methacrylates: phthalates, such as diethylisobutyl-, diisobutyl-, dioctyl-, neopentyl-, diphenyl-, benzylbutylphthalate; diphenylcarbonate; ethyldiphenylacetate; isobutylbenzoylacetate; 1,2-dihydroxy-diacetate-benzene, diisobutyl-2.3-naphthalene-dicarboxylate, and orthoesters, such as triethyl-orthobenzoate.

Suitable ethers are diethylether, dibutylether, diisoamylether, dioctylether, dioxane, trioxane, tetrahydrofuran, ethylene glycol-dimethylether, and hindered ethers as methylcumylether.

Other typical electron-donor compounds include propylene oxide, epichlorhydrin; benzophenone; phosphites, such as triphenylphosphite; triphenylphosphine; $POCl_3$; alpha-methyl-alpha-phenylacetylchloride; benzoyl chloride, bromide, and iodide: tolyl chloride: butyrolactone, and in general all the electron-donor compounds cited in European patent application Nos. 8647, 86472 and 86473.

Examples of silicon compounds are: (ethyl)Si(OEt)$_3$, (phenyl)Si(OEt)$_3$, (propyl)Si(OEt)$_3$, (butyl)Si(OEt)$_3$, (isopropyl)Si(OEt)$_3$, (isobutyl)Si(OEt)$_3$, (sec-butyl)$_2$Si(OEt)$_2$, (tert-butyl)Si(OEt)$_3$, (tolyl)Si(OEt)$_3$, (cyclohexyl)Si(OEt)$_3$, (chlorophenyl)Si(OEt)$_3$, (chloroethyl)Si(OEt)$_3$, (trifluoropropyl)Si(OEt)$_3$, (neopentyl)Si(OEt)$_3$, (cyclohexyl)Si(OCH$_3$)$_3$, (decyl)Si(OCH$_3$)$_3$, (octyl)Si(OCH$_3$)$_3$, (phenyl)Si(OCH$_3$)$_3$, (tert-butyl)-

$_2$Si(OCH )$_2$, (cyclohexyl)$_2$Si(OCH$_3$)$_2$, (tolyl)$_2$Si(OCH$_3$)$_2$. (isopropyl)$_2$Si(OCH$_3$)$_2$, (cyclohexyl)CH$_3$Si(OCH$_3$)$_3$, (tert-butyl)CH$_3$Si(OCH$_3$)$_2$, (trifluoropropyl)CH$_3$Si(OCH$_3$)$_2$ (isopropyl)CH$_3$Si(OCH$_3$)$_2$, (sec-butyl)CH$_3$Si(OCH$_3$)$_2$, n-butyl(CH$_3$)Si(OCH$_3$)$_2$, n-octyl(CH$_3$)Si(OCH$_3$)$_2$, phenyl(CH$_3$)Si(OCH$_3$)$_2$, (sec-butyl)$_2$Si(OCH$_3$)$_2$, (trifluoropropyl)$_2$Si(OCH$_3$)$_2$, (phenyl)ClSi(OCH$_3$)$_2$, (ethyl)Si(isoC$_3$H$_7$)$_3$, ClSi(OEt)$_3$, CH$_2$=CHSi(OEt)$_3$, (phenyl)$_3$SiOCH$_3$ and Si(OCH$_3$)$_4$.

Examples of heterocyclic compounds containing at least one nitrogen atom are 2,2,6,6-tetramethyl piperidine and 2,6-diisopropyl piperidine.

The active anhydrous Mg dihalides forming the essential support of the solid component of this invention show an X-ray powder spectrum in which the most intense diffraction line characteristic of the spectrum of the normal non-activated Mg dihalide is replaced by a halo, the intensity peak of which is shifted with respect to the interplanar distance of the most intense line of the non-activated Mg dihalide. From these Mg dihalides it is possible to prepare, by heat-treating in inert hydrocarbon solvents, forms which have an X-ray powder spectrum with a broadening of the most intense diffraction line which is replaced by halo. These active forms of Mg dihalides are also suitable for use in preparing the catalyst component of the present invention.

Generally, the surface area of the active form of Mg dihalide is greater than 30-40 m$^2$/g, preferably between 100-300 m$^2$/g.

The preferred Mg dihalides are Mg dichloride and Mg dibromide. The water content in the Mg dihalides is generally less than 1% by weight.

The AH compound is preferably used in an amount corresponding to a molar ratio of Mg/moles of AH compound of between 5 and 10.

Suitable AH compounds are aliphatic alcohols, particularly the C$_2$-C$_8$ alcohols, cycloaliphatic alcohols, phenols, ortho-substituted phenols, p-cresol, β-naphthol, 2,6-ditertburyl-p-cresol (BHT), amines, carboxylic acids also containing heteroatoms, sulfonic acids, amides, glycols and acetylacetone.

Typical C$_2$-C$_8$ aliphatic alcohols are ethanol, 1-butanol, and 2-methyl-1-propanol. A suitable ortho-substituted phenol is 4-tertbutylphenol. Trifluoromethanesulphonic acid is a typical sulfonic acid and ethylene glycol is a typical glycol.

The preferred AH compounds are aliphatic and cycloaliphatic alcohols, and the most preferred are ethanol and butanol.

The liquid reaction medium having a dielectric constant greater than 2 at 20° C. preferably is an organic halogenated compound. Specific examples are methyl chloride. 1,2-dichloroethane, chlorobenzene, chloroform. bromoform, methyl bromide, o-dichlorobenzene and benzyl chloride.

It is essential that the liquid medium be inert. With respect to the Ti component and the other components of the catalyst component.

The reaction of the solid catalyst-forming component with the AH compound can be carried out at a temperature from 0° to 120° C. Preferably the reaction is carried out at a temperature from 40° to 80° C.

The solid catalyst-forming component which is reacted with the AH compound according to this invention may be prepared by various methods. One of the preferred methods is to co-mill the Mg dihalide, the Ti compound having at least one Ti-halogen bond and the electron-donor compound when it is used, until the X-ray spectrum of the milled product has the characteristics set forth above for the spectrum of the activated Mg dihalide, heat-treating the milled product in suspension in the halogenated hydrocarbon, such as, e.g., 1,2 dichloroethane, separating the solid product and washing it with heptane or a similar hydrocarbon solvent. The duration of the treatment is generally between 1 and 4 hours and depends on the temperature of treatment.

According to another method, an adduct of Mg dihalide and an alcohol is reacted with TiCl$_4$. The above methods are described in Belgian Patent No. 868.682 and published German patent application No. 3,022,738.

Other known methods which lead to the formation of Mg dihalide in active form or to Ti-containing Mg dihalide supported components in which the Mg dihalide is present in active form, include (1) the reaction of a Grignard reagent or a MgR$_2$ compound (R being a hydrocarbyl radical) or complexes of said MgR$_2$ compounds with Al trialkyls, with halogenating agents as AlX$_3$ or AlR$_m$X$_n$ compounds (X is halogen, R is a hydrocarbyl, m+n=3), SiCl$_4$ or HSiCl$_3$;

(2) the reaction of a Grignard reagent with a silanol or polysiloxane, H$_2$O or with an alcohol and further reaction with a halogenating agent, or with TiCl$_4$;

(3) the reaction of Mg with an alcohol and hydrohalogenic acid, or of Mg with a hydrocarbyl halide and an alcohol;

(4) the reaction of MgO With Cl$_2$ or AlCl$_3$;

(5) the reaction of MgX$_2$.nH$_2$O (X=halogen and n=0.5-6.0) with a halogenating agent or TiCl$_4$; and (6) the reaction of Mg mono- or dialcoholates or Mg carboxylates with a halogenating agent.

The Al-alkyl compound (a) is preferably an Al-trialkyl, such as Al-triethyl, Al-triisobutyl, and Al-tri-n-butyl.

Other suitable Al-alkyl compounds include linear or cyclic compounds containing two or more Al atoms bound to each other through oxygen atoms or other hetero atoms as:

(C$_2$H$_5$)$_2$Al—O—Al(C$_2$H$_5$)$_2$, (C$_2$H$_5$)$_2$Al—N—Al(C$_2$H$_5$)$_2$,
                                                           |
                                                         C$_6$H$_5$

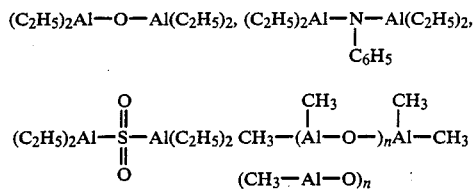

where n is an integer ranging from 1 to 20. Compounds having general formula AlR$_2$OR' can be also employed, where R' is an aromatic radical substituted in position 2 or 6 or both positions, and R is an alkyl radical containing from 1 to 8 carbon atoms.

The Al-alkyl compounds may be employed in mixture with Al-alkyl halides, such as AlEt$_2$Cl.

As already indicated, the catalysts of the present invention are useful in polymerization of alpha-olefins having formula R—CH=CH$_2$, where R is an alkyl or aryl group containing from 1 to 8 carbon atoms. In particular the catalyst are useful in the polymerization of propylene, 1-butene, 4-methyl-1-pentene, and mixtures thereof, or in the polymerization of the alpha-olefins or mixtures thereof with ethylene.

The polymerization is carried out according to known methods, in a liquid phase, either in the presence or absence of an inert hydrocarbon solvent, or in gas phase, or by combining a liquid phase polymerization step with a gas phase step.

In general the polymerization is carried out at a temperature between 40° C. and 160° C., preferably between 60° and 90° C. at either atmospheric or greater than atmospheric pressure.

As a molecular weight regulator, hydrogen or other regulators are used.

The olefin(s) may be prepolymerized by contacting the catalyst with small amounts of the olefin(s), especially for the improvement of the morphology of the polymer.

The prepolymerization is carried out by feeding the olefin in a suspension of the solid catalyst component in an inert hydrocarbon solvent containing, in solution, the Al-alkyl compound and, optionally the electron-donor compound.

The amount of the polymer produced in the prepolymerization step is typically between 0.5 and 3 times the weight of the solid catalyst component.

The following examples illustrate the preferred embodiments of the invention.

EXAMPLE 1

(A) Preparation of the solid catalytic component.

The solid catalytic component is prepared under nitrogen atmosphere by comilling 8.68 g of anhydrous $MgCl_2$ and 18.5 g of diisobutylphthalate for 60 hours in a vibrating mill of vibratom type, manufactured by N.V. Team S, Gravenhage, Holland, having total volume of one liter and containing 3.485 kg of stainless steel balls having diameter of 15.8 mm.

25 g of the product obtained are contacted with 210 ml of $TiCl_4$ at 80° C. for 2 hours. After this period $TiCl_4$ is removed by filtration at 80° C. and the residual solid is repeatedly washed with hexane at 65° C., until the chlorine ions disappear from the filtrate. The solid is then dried under vacuum. The Ti content of the resulting product is 2.4%.

4.0 grams of this solid catalytic component are suspended in 30 ml of 1,2-dichloroethane (DCE). A solution of 0.50 ml of n-butyl alcohol in 10 ml of DCE is added dropwise to the suspension over a period of ten minutes. The temperature is raised to 80° C. and the reaction is continued for 2 hours. A suspension is obtained.

(B) Polymerization of propylene. Into a 2 liter stainless steel autoclave, there are introduced, at 50° C., a suspension of 3.5 millimoles of Al 3 and 0.175 millimoles of phenyltriethoxysilane in 25 ml of n-heptane, and 0.5 ml of the suspension prepared according to the method described in (A) above under a propylene atmosphere. The autoclave is closed, pressure of 0.1 atm of H is applied. 400 g of propylene are injected and the temperature is raised to 70° C. The polymerization is continued for 2 hours, then the residual monomer is removed and the polymer is isolated. The results of the polymerization reaction is reported in Table 2.

EXAMPLE 2

Example 1 is repeated except that more n-butyl alcohol is employed in the preparation of (A). The amounts employed and the result of the polymerization reaction are reported in Tables 1 and 2. respectively.

EXAMPLES 3–13

Example 1 is repeated except that the particular reaction medium and compound AH used, and the amounts used in the preparation of (A) are as set forth in Table 1. The results to the polymerization tests are reported in Table 2.

EXAMPLE 1 (comparative)

Example 1 is repeated except that n-hexane is used as the reaction medium in the preparation of (A). The results of the polymerization reaction are reported in Table 2.

EXAMPLE 2 (comparative)

Example 1 is repeated except that the addition of butyl alcohol in DCE is omitted.

TABLE 1

| | Preparation of the catalytic component (A) | | | |
|---|---|---|---|---|
| | AH | | Reaction medium | |
| Example No. | Type | Mg/AH (molar ratio) | Type | Dielectric constant |
| 1 | n-butyl alcohol | 5 | 1,2-dichloroethane | 10.6 |
| 2 | n-butyl alcohol | 10 | 1,2-dichloroethane | |
| 3 | Ethanol | 5 | 1,2-dichloroethane | |
| 4 | Isobutane | 10 | 1,2-dichloroethane | |
| 5 | BHT[1] | 5 | 1,2-dichloroethane | |
| 6 | BHT[1] | 10 | 1,2-dichloroethane | |
| 7 | Ethylene glycol | 5 | 1,2-dichloroethane | |
| 8 | Ethylene glycol | 10 | 1,2-dichloroethane | |
| 9 | Trifluoroethanol | 20 | 1,2-dichloroethane | |
| 10 | Trifluoromethane sulfonic acid | 20 | 1,2-dichloroethane | |
| 11 | n-butyl alcohol | 5 | o-dichlorobenzene | 9.9 |
| 12 | n-butyl alcohol | 5 | Chlorobenzene | 5.7 |
| 13 | n-butyl alcohol | 5 | Benzyl chloride | 7.0 |
| *1 | n-butyl alcohol | 5 | n-hexane | 1.89 |
| *2 | — | — | — | — |

[1]BHT = 2,6-di-tert-butyl p-cresol.
*Comparative

TABLE 2

| | Polymerization | | | | |
|---|---|---|---|---|---|
| Suspension prepared according to Example No. | Ti content of the polymer (p.p.m.) | I.I., %* | MFI (g/10') | GPC Mw/Mn | Bulk density (g/cc.) |
| 1 | 10 | 96.8 | 55 | 4 | 0.42 |
| 2 | 8.5 | 95.1 | 37 | 3.6 | 0.44 |
| 3 | 11 | 95.9 | 47 | 3.6 | 0.43 |
| 4 | 9 | 94.8 | 53 | 3.7 | 0.44 |
| 5 | 7 | 92.9 | 39 | 3.9 | 0.45 |
| 6 | 6 | 92.9 | 41 | 3.9 | 0.47 |
| 7 | 14 | 92.6 | 48 | 3.6 | 0.42 |
| 8 | 12 | 91.4 | 45 | 3.7 | 0.44 |
| 9 | 10 | 89.4 | 30 | 4 | 0.42 |
| 10 | 9 | 89.4 | 25 | 4 | 0.40 |
| 11 | 12 | 92.7 | 55 | 4.05 | 0.40 |
| 12 | 13 | 93.5 | 49 | 3.7 | 0.41 |
| 13 | 12 | 92 | 46 | 3.7 | 0.41 |
| **1 | 6 | 91.1 | 30 | 5.1 | 0.42 |
| **2 | 4.6 | 95.8 | 35 | 4.6 | 0.44 |

*I.I. = isotacticity index, corresponding to the % of polymer soluble in boiling n-heptane.
**Comparative.

What is claimed:
1. A catalyst for the (co)polymerization of alpha-olefins having the formula $CH_2=CHR$, where R is a $C_{1-8}$ alkyl or aryl group to stereoregular polymers having a narrow molecular weight distribution of less than 4 consisting essentially of the reaction product of:
(1) a solid catalyst component of (a) a Ti compound having at least one Ti-halogen bond and (b) optionally, an electron donor compound, supported on an anhydrous Mg dihalide in active form and which is treated with an organic compound (AH) having at least one active hydrogen atom, in an amount corresponding to a molar ratio of Mg/moles of compound AH of between 2 and 30, in the presence of a liquid medium of an organic halogenated compound having a dielectric constant of greater than 2 at 20° C. which does not react with the other components,
(2) an Al-alkyl compound selected from the group consisting of an Al-trialkyl compound and linear or cyclic Al-alkyl compounds containing two or more Al atoms bound to each other through oxygen, nitrogen or sulfur atoms selected from the group consisting of

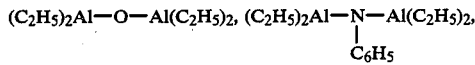

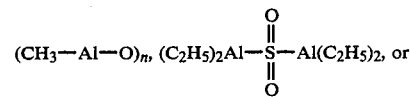

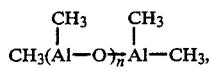

where n is from 1 to 20
(3) an electron donor compound.

2. The catalyst of claim 1 in which the electron-donor compound (b) is present.

3. The catalyst of claim 1 in which the organic compound AH is selected from the group consisting of aliphatic alcohols, cycloaliphatic alcohols, phenols, cresols, naphthol, amines, carboxylic acids, sulfonic acids, amides, glycols and acetylacetone.

4. The catalyst of claim 2, in which (2) is an Al-trialkyl compound.

5. The catalyst of claim 3, in which (2) in an Al-trialkyl compound.

6. A process for preparing a catalyst for the (co)-polymerization of alpha-olefins having the formula $CH_2CHR$, where R is a $C_{1-8}$ alkyl or aryl group, to stereoregular polymers having a narrow molecular weight distribution of less than 4, consisting essentially of the reaction product of:
(1) a solid catalyst component of a) a Ti compound having at least one Ti-halogen bond and (b) optionally, an electron donor compound, supported on an anhydrous Mg halide in active form and which is treated with an organic compound (AH) having at least one active hydrogen atom, in an amount corresponding to a molar ratio of Mg/moles of compound AH of between 2 and 30, in the presence of a liquid medium of an organic halogenated compound having a dielectric constant of greater than 2 at 20° C. which does not react with other components,
(2) an Al-alkyl compound selected from the group consisting of an Al-trialkyl compound and linear or cyclic Al-alkyl compounds containing two or more Al atoms bound to each other through oxygen, nitrogen or sulfur atoms selected from the group consisting

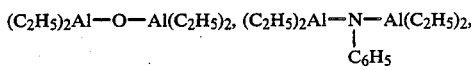

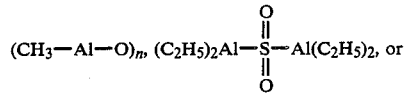

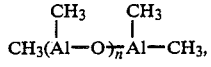

where n is from 1 to 20
(3) an electron donor compound.

7. The process of claim 6 in which the organic compound AH is selected from the group consisting of aliphatic alcohols, cycloaliphatic alcohols, phenols, cresols, naphthol, amines, carboxylic acids, sulfonic acids, amides, glycols and acetylacetone.

8. The catalyst of claim 1, in which (2) is an al-trialkyl compound.

* * * * *